(12) United States Patent
Nystad

(10) Patent No.: US 10,338,889 B2
(45) Date of Patent: Jul. 2, 2019

(54) APPARATUS AND METHOD FOR CONTROLLING ROUNDING WHEN PERFORMING A FLOATING POINT OPERATION

(71) Applicant: ARM LIMITED, Cambridge (GB)

(72) Inventor: Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 158 days.

(21) Appl. No.: 15/156,379

(22) Filed: May 17, 2016

(65) Prior Publication Data

US 2017/0010863 A1  Jan. 12, 2017

(30) Foreign Application Priority Data

Jun. 12, 2015 (GB) .................................. 1510310.4

(51) Int. Cl.
*G06F 7/483* (2006.01)
*G06F 7/499* (2006.01)

(52) U.S. Cl.
CPC .......... *G06F 7/49947* (2013.01); *G06F 7/483* (2013.01)

(58) Field of Classification Search
CPC .................................................... G06F 7/4873
See application file for complete search history.

(56) References Cited

U.S. PATENT DOCUMENTS 7,738,657 B2 * 6/2010 Gopal .................... G06F 7/535
380/28
8,990,278 B1 * 3/2015 Clegg .................... G06F 7/544
708/272

(Continued)

FOREIGN PATENT DOCUMENTS

EP  2 112 591  10/2009

OTHER PUBLICATIONS

Hou-Jen Ko, et al., Design and Application of Faithfully Rounded and Truncated Multipliers with Combined Deletion, Reduction, Truncation, and Rounding, IEEE Transactions on Circuits and Systems II: Express Briefs, vol. 58, No. 5, May 2011, pp. 304-308.*

(Continued)

*Primary Examiner* — Andrew Caldwell
*Assistant Examiner* — Emily E Larocque
(74) *Attorney, Agent, or Firm* — Nixon & Vanderhye P.C.

(57) ABSTRACT

An apparatus and method are provided for controlling rounding when performing a floating point operation. The apparatus has argument reduction circuitry to perform an argument reduction operation, and in addition provides reduce and round circuitry that generates from a supplied floating point value a modified floating point value to be input to the argument reduction circuitry. The reduce and round circuitry is arranged to modify a significand of the supplied floating point value, based on a specified value N, in order to produce a truncated significand with a specified rounding applied, the truncated significand being N bits shorter than the significand of the supplied floating point value, and then being used as a significand for the modified floating point value. The specified value N is chosen such that the argument reduction operation performed using the modified floating point value will inhibit roundoff error in a result of the argument reduction operation. By enabling roundoff error to be inhibited in such a way, it is possible to use such argument reduction circuitry in the computation of a number of floating point operations while enabling the correct rounded result to be obtained.

20 Claims, 12 Drawing Sheets

(56) References Cited

U.S. PATENT DOCUMENTS

Figure 1:
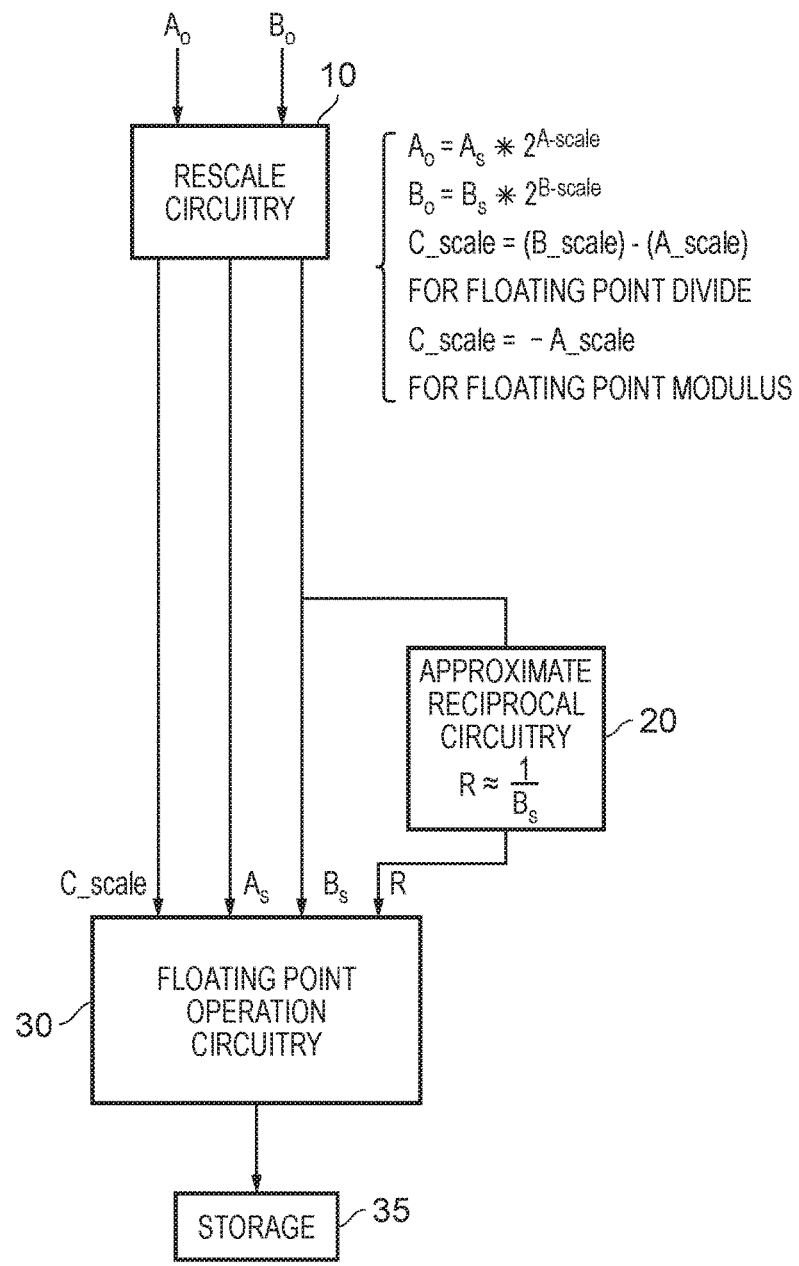

2007/0078923 A1\* 4/2007 Dockser ................. G06F 7/483
708/492
2013/0212139 A1 8/2013 Gschwind et al.
2014/0195580 A1 7/2014 Anderson et al.

OTHER PUBLICATIONS

Kent E. Wires, et al., Variable-Correction Truncated Floating Point Multipliers, IEEE, 2000. pp. 1344-1348.\*
Combined Search and Examination Report for GB1510310.4 dated Dec. 2, 2015, 7 pages.

\* cited by examiner

P1 AND P2 ARE EXACT VALUES IN THE STANDARD FLOATING - POINT FORMAT

APPARATUS AND METHOD FOR CONTROLLING ROUNDING WHEN PERFORMING A FLOATING POINT OPERATION

This application claims priority to GB Patent Application No. 1510310.4 filed 12 Jun. 2015, the entire content of which is hereby incorporated by reference.

BACKGROUND

The present technique relates to an apparatus and method for controlling rounding when performing a floating point operation.

There are various floating point operations that are typically expensive to perform accurately, in terms of the complexity of the circuitry required and/or the computation time required to produce the result. One such floating point operation is a floating point divide operation, where a first floating point number is divided by a second floating point number. To perform an accurate floating point divide operation typically takes a large number of clock cycles to perform, which can significantly impact the performance of the processing circuitry implementing the divide operation.

Whilst one may seek to construct dedicated logic circuitry to increase performance of such a divide operation, this would significantly increase the cost and complexity of the resulting processing circuitry, for example in terms of silicon area cost and high verification effort.

Typically techniques that seek to perform floating point division with less impact on performance cannot be guaranteed to produce entirely accurate results for the floating point divide operation.

It would be desirable to provide a mechanism that enabled certain floating point operations such as the above mentioned floating point divide operation to be performed more efficiently by data processing circuitry, whilst still ensuring that an accurate result is obtained.

SUMMARY

In accordance with one example configuration, there is provided an apparatus comprising: argument reduction circuitry to perform an argument reduction operation; and reduce and round circuitry to generate from a supplied floating point value a modified floating point value to be input to the argument reduction circuitry; the reduce and round circuitry being arranged to modify a significand of the supplied floating point value, based on a specified value N, in order to produce a truncated significand with a specified rounding applied, the truncated significand being N bits shorter than the significand of the supplied floating point value, and being used as a significand for the modified floating point value; the specified value N being such that the argument reduction operation performed using the modified floating point value inhibits roundoff error in a result of the argument reduction operation.

In accordance with a further example configuration, there is provided a method of controlling rounding when performing a floating point operation within a data processing apparatus, comprising: employing argument reduction circuitry to perform an argument reduction operation; and performing a reduce and round operation to generate from a supplied floating point value a modified floating point value to be input to the argument reduction circuitry; the reduce and round operation modifying a significand of the supplied floating point value, based on a specified value N, in order to produce a truncated significand with a specified rounding applied, the truncated significand being N bits shorter than the significand of the supplied floating point value, and being used as a significand for the modified floating point value; the specified value N being such that the argument reduction operation performed using the modified floating point value inhibits roundoff error in a result of the argument reduction operation.

In accordance with a yet further example configuration, there is provided an apparatus comprising: argument reduction means for performing an argument reduction operation; and reduce and round means for generating from a supplied floating point value a modified floating point value to be input to the argument reduction means; the reduce and round means for modifying a significand of the supplied floating point value, based on a specified value N, in order to produce a truncated significand with a specified rounding applied, the truncated significand being N bits shorter than the significand of the supplied floating point value, and being used as a significand for the modified floating point value; the specified value N being such that the argument reduction operation performed using the modified floating point value inhibits roundoff error in a result of the argument reduction operation.

BRIEF DESCRIPTION OF THE DRAWINGS

The present technique will be described further, by way of example only, with reference to embodiments thereof as illustrated in the accompanying drawings, in which:

FIG. 1 is block diagram illustrating an apparatus in accordance with one embodiment;

FIGS. 2A and 2B illustrate circuit components that may be provided within the floating point operation circuitry of FIG. 1 in accordance with one embodiment, in order to enable the apparatus of FIG. 1 to perform a floating point divide operation;

FIG. 3 is a block diagram illustrating how a fused multiply accumulate circuit may be augmented in order to enable that circuit to perform the functionality of FIGS. 2A and 2B in accordance with one embodiment;

FIG. 4 illustrates a reduce and round operation in accordance with one embodiment;

FIG. 5 is a flow diagram illustrating how a selective round to odd operation may be implemented in order to enable a correctly rounded result for the floating point divide operation to be obtained in accordance with one embodiment;

FIGS. 6A to 6C, 7A and 7B illustrate the round to odd processing step in accordance with one embodiment;

FIG. 8 schematically illustrates how the implementation of the round to odd processing step of one embodiment ensures that a correctly rounded summation is performed when generating the result of the floating point divide operation in accordance with one embodiment;

FIG. 9 illustrates an optional step that may be implemented to selectively remove one of the computation steps of FIG. 2A in accordance with one embodiment;

FIG. 10 is a flow diagram illustrating how the circuitry of FIG. 1 may be modified to perform a floating point modulus operation in accordance with one embodiment; and FIG. 11 illustrates single and double precision floating point formats that may be used within the apparatus of the described embodiments.

DESCRIPTION OF EMBODIMENTS

Before discussing the embodiments with reference to the accompanying figures, the following description of embodiments is provided.

In accordance with one embodiment an apparatus is provided that comprises argument reduction circuitry to perform an argument reduction operation. In addition, reduce and round circuitry is provided to generate, from a supplied floating point value, a modified floating point value to be input to the argument reduction circuitry. This reduce and round circuitry modifies the significand of the supplied floating point value, based on a specified value N, so as to produce a truncated significand with a specified rounding applied. The truncated significand is then N bits shorter than the significand of the supplied floating point value and is used as a significand for the modified floating point value. The specified value N is chosen such that the argument reduction operation performed using the modified floating point value inhibits roundoff error in a result of the argument reduction operation.

This approach enables such argument reduction operations to be performed as part of the processing required to perform a specified floating point operation such as the earlier-mentioned floating point divide operation. Such argument reduction operations can be readily implemented within the apparatus, for example using circuitry that already exists for other purposes within the apparatus, such as a multiply-accumulate circuit. However, normally it would be expected that roundoff errors would be introduced when performing such an argument reduction operation, which could prevent the production of an exact result when the argument reduction circuitry is used to implement part of a floating point operation such as the earlier-mentioned floating point divide operation.

However, by use of the reduce and round circuitry as set out above, and in particular the production of a modified floating point value having a truncated significand for use as an input to the argument reduction circuitry, this prevents roundoff error being introduced into the result of the argument reduction operation, and facilitates the use of an argument reduction circuit within circuitry used to compute floating point operations such as floating point divide operations, whilst still enabling an accurate result to be obtained.

There are a number of ways in which the specified value N may be determined. However, in one embodiment, the specified value N is such that the modified floating point value has an error bound of less than 1 unit of least precision (ulp) of the N bits shorter truncated significand. By virtue of the modified floating point value having such an error bound, this then ensures that the argument reduction operation can be performed without introducing roundoff error.

There are a number of ways in which the specified value N can be chosen so as to achieve such an error bound. However, in one embodiment the specified value N is the smallest integer value that ensures that the modified floating point value has an error bound of less than 1 ulp.

The reduce and round operation can be performed in a variety of ways. However, in one embodiment the significand of the supplied floating point value comprises M bits, and the reduce and round circuitry is arranged to inject a rounding value at an N-th bit position of the significand of the supplied floating point value to produce a rounded value, and then to form as the truncated significand the most significant M−N bits of the rounded value. The bit label associated with the N-th bit position will depend on implementation. For example, if the M bit significand of the supplied floating point value is considered to consist of bits 1 to M, then the rounding value will be injected at bit N. However, in one embodiment the M bits of the significand are labelled as bits 0 to M−1, and in that embodiment the rounding value is injected at the N-th bit position by injecting the rounding value at bit N−1.

The specified rounding applied by the reduce and round circuitry can take a variety of forms, and in one embodiment is a round to nearest away rounding. In an alternative embodiment however, the specified rounding may be a round to nearest even rounding.

Whilst the truncated significand will comprise M−N bits, it is in one embodiment convenient to still represent the truncated significand within an M-bit value, and in one embodiment this is achieved by representing the truncated significand as an M-bit value where the least significant N bits of the M-bit value are set to logic 0 values.

In one embodiment, the specified value N is dependent on a floating point format of the supplied floating point value. For example, in one specific embodiment, it has been found that when the floating point format is single precision format (i.e. FP32 format), then N can be set equal to 3, whereas when the floating point format is double precision format (i.e. FP64 format), then N may be set equal to 10.

The argument reduction operation can take a variety of forms, but in one embodiment it is a multiply-accumulate operation. Due to the above described operation of the reduce and round function, then in one embodiment the argument reduction circuitry may comprise fused multiply-accumulate circuitry, with the result produced by the fused multiply-accumulate circuitry having no roundoff error, due to the use of the modified floating point value as an input to the fused multiply-accumulate circuit.

In one embodiment, the argument reduction circuitry and the reduce and round circuitry are employed in a plurality of iterations, in each iteration other than a first iteration the supplied floating point value received by the reduce and round circuitry being derived from a result value generated by the argument reduction circuitry in a preceding iteration.

It has been found that such iterations work correctly with normalized floating point numbers, but that if denormal floating point numbers were to enter into the iterations, then this could cause the iterations to no longer work correctly.

In accordance with one embodiment, additional circuitry is provided to enable sufficient iterations to be performed without encountering denormals. In particular, in one embodiment, the apparatus further comprises resealing circuitry to receive at least one floating point operand value and, for each floating point operand value, to perform a resealing operation to generate a corresponding resealed floating point value such that the resealed floating point value and the floating point operand value differ by a scaling factor. The argument reduction circuitry is arranged to receive, in addition to the modified floating point value, at least one additional floating point value determined from said at least one resealed floating point value, and the scaling factor is chosen such that an exponent of each resealed floating point value will ensure that no denormal values will be encountered when performing the plurality of iterations of the argument reduction operation. Such an approach hence ensures that every iteration can be performed correctly without introducing roundoff errors.

In one embodiment, the resealing circuitry is arranged to generate first and second resealed floating point values, and the apparatus is arranged to generate a result equivalent to performing a specified floating point operation on first and second floating point operand values from which said first and second resealed floating point values are generated by the resealing circuitry.

In one embodiment, in each iteration other than the first iteration the supplied floating point value received by the reduce and round circuitry is an output of a multiplication operation performed using as one input the result value generated by the argument reduction circuitry in a preceding iteration.

Whilst in one embodiment it is possible to implement the reduce and round function as a separate operation to the multiplication operation, in one embodiment it is possible to implement the multiplication operation followed by the reduce and round operation as a single fused operation.

The specified floating point operation can take a variety of forms, but in one embodiment is a floating point divide operation to divide the first floating point operand value by the second floating point operand value.

In such an embodiment, the result for the floating point divide operation may be determined by adding together the plurality of modified floating point values produced by the reduce and round circuitry during the plurality of iterations.

In one embodiment, it has been found that the number of iterations in the plurality may be predetermined when performing such a floating point divide operation. In particular, in one embodiment the number is chosen so as to ensure that the result for the floating point divide operation will equate with division of the first floating point operand value by the second floating point operand value rounded in accordance with a specified rounding mode for the floating point divide operation. In particular, it has been found that using only a relatively small number of iterations, a result can be obtained which directly corresponds with the division of the first floating point operand by the second floating point operand (i.e. is the correct result), and which can also be rounded correctly in accordance with the specified rounding mode. In one embodiment, it has been found that this is true, irrespective of the rounding mode specified.

In one embodiment, the plurality of the modified floating point values are added together by performing a series of addition operations. For each addition operation other than a final addition operation, in one embodiment a round to odd rounding function is applied to the result of that addition if the result of that addition is not exactly representable in a specified floating point format. The specified floating point format may for example be either the earlier mentioned single precision format or double precision format.

In one embodiment, when the scaling factor associated with the first rescaled floating point value is different from the scaling factor associated with the second rescaled floating point value, a final addition operation is augmented to take account of the difference between the scaling factors when performing the final addition. It has been found that the final addition operation can be readily modified to take account of the scaling factor difference. For example, in one embodiment the final addition operation is augmented so as to adjust the exponent of the addition result by an amount determined from the difference between the scaling factors, prior to a final rounding of the addition result being performed. Typically, a pre-normalization result exponent will already have been computed, which can then selectively be adjusted during the final rounding operation if required. By adjusting this pre-normalization exponent during the addition step to take account of the difference between the scaling factors, this prevents the possibility of double-rounding being performed when producing the final result, and hence ensures that a correctly rounded result is always obtained, even when the scaling factors are different.

As mentioned earlier, when performing a floating point divide operation, it has been found that the number of iterations during which the argument reduction circuitry and the reduce and round circuitry are employed can be predetermined. In one particular embodiment, it is also possible to selectively exclude the final iteration under certain conditions. In particular, in one embodiment the apparatus further comprises analysis circuitry to analyse specified bits of the modified floating point value produced in a penultimate iteration, and to cause the final iteration to be omitted when the analysis indicates that the specified bits are other than at least one predetermined bit pattern.

The predetermined bit pattern can take a variety of forms, but in one embodiment comprises a pattern of all 1s or a bit pattern of all 0s appearing in a predetermined sequence of bits within the modified floating point value produced in the penultimate iteration.

Whilst in one embodiment the specified floating point operation is a floating point divide operation, the apparatus can in one embodiment instead be used to perform other floating point operations. For example, in one embodiment the specified floating point operation is a floating point modulus operation to evaluate a remainder resulting from dividing the first floating point operand value by the second floating point operand value. When performing such a floating point modulus operation, the result value for the floating point modulus operation may be determined from a result value generated by the argument reduction circuitry in the iteration where the result value is less than the second rescaled floating point value. Hence, the iterations can be terminated at the point where the result value produced by a current iteration is less than the second rescaled floating point value.

In one embodiment, when performing a floating point modulus operation, the same scaling factor is associated with the first and second rescaled floating point values. Accordingly, there is no need to provide any circuitry to compensate for any differences in the scaling factors.

In one embodiment, the apparatus further comprises a reciprocal estimation circuit to generate an estimated reciprocal of the second rescaled floating point value with a relative error having an error bound of Y (for example measured in ulps), and the specified value N is dependent on the value Y. It is often the case that a suitable reciprocal estimation circuit may already be provided by the apparatus. The reciprocal estimation circuitry may estimate the reciprocal in a number of different ways, but one example involves determining an initial estimation of some sort followed by one or more Newton iterations. For the purposes of the present technique, it does not matter how the estimated reciprocal is generated, as long as an upper bound on the calculation's error is known. Once the error bound Y is known, it is possible to readily calculate the appropriate specified value N that will ensure that the argument reduction operation can be formed without creating any roundoff error in the result.

Particular embodiments will now be described with reference to the Figures.

Before discussing the embodiments in detail, the following provides a brief summary of floating point number formats. Processors for performing arithmetic operations on floating point numbers are known. In floating point representation, numbers are represented using a significand 1.F, an exponent E and a sign bit S. The sign bit S represents whether the floating point number is positive or negative, the significand 1.F represents the significant digits of the floating point number, and the exponent E represents the position of the radix point (also known as a binary point) relative to the significand. By varying the value of the exponent, the radix point can "float" left and right within the significand. This means that for a predetermined number of bits, a floating point representation can represent a wider range of numbers than a fixed point representation (in which the radix point has a fixed location within the significand). However, the extra range is achieved at the expense of reduced precision since some of the bits are used to store the exponent. Sometimes, a floating point arithmetic operation generates a result with more significant bits than the number of bits used for the significand. If this happens then the result is rounded to a value that can be represented using the available number of significant bits.

Figure 11:
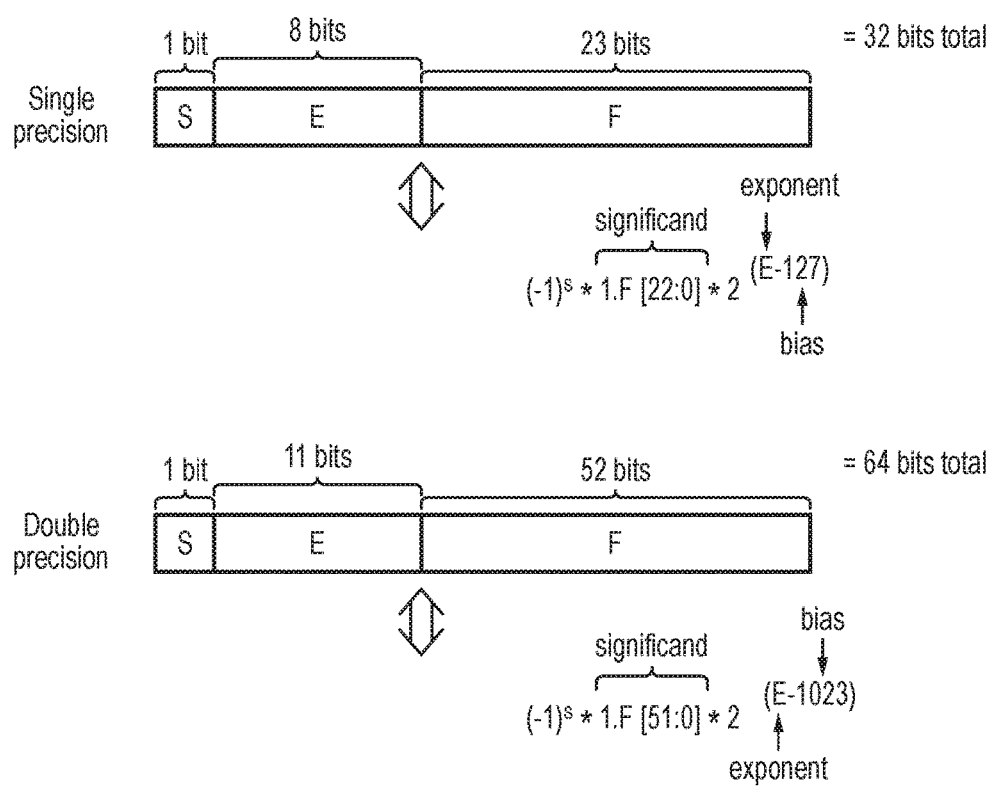

FIG. 11 shows how floating point numbers may be stored within a register or memory. In a single precision (SP) representation (also referred to herein as FP32), 32 bits are used to store the floating point number. One bit is used as the sign bit S, eight bits are used to store the exponent E, and 23 bits are used to store the fractional portion F of the significand 1.F. The 23 bits of the fractional portion F, together with an implied bit having a value of one, make up a 24-bit significand 1.F. The radix point is initially assumed to be placed between the implied bit and the 23 stored bits of the significand. The stored exponent E is biased by a fixed value 127 such that in the represented floating point number the radix point is shifted left from its initial position by E-127 places if E-127 is negative (e.g. if E-127=-2 then a significand of 1.01 represents 0.0101), or right from its initial position by E-127 places if E-127 is positive (e.g. if E-127=2 then a significand of 1.01 represents 101). The bias is used to make it simpler to compare exponents of two floating point values as then both negative and positive shifts of the radix point can be represented by a positive value of the stored exponent E. As shown in FIG. 11, the stored representation S[31], E[30:23], F[22:0] represents a number with the value $(-1)^S*1.F[22:0]*2^{(E-127)}$. A single-precision floating point number in this form is considered to be "normal". If a calculated floating point value is not normal (for example, it has been generated with the radix point at a position other than between the left-most two bits of the significand), then it is normalized by shifting the significand left or right and adjusting the exponent accordingly until the number is of the form $(-1)^S*1.F[22:0]*2^{E-127}$. Special case handling (e.g. exception handlers or dedicated hardware) is provided to handle numbers that cannot be represented as a normal floating point value.

A double precision (DP) format (also referred to herein as FP64) may also be provided in which the significand and exponent are represented using 64 stored bits. The 64 stored bits include one sign bit, an 11-bit exponent and the 52-bit fractional portion F of a 53-bit significand 1.F. In double precision format the exponent E is biased by a value of 1023. Thus, in the double precision format a stored representation S[63], E[62:52], F[51:0] represents a floating point value $(-1)^S*1.F[51:0]*2^{E-1023}$.

The embodiments described hereafter are generally applicable to SP or DP numbers.

FIG. 1 is a block diagram schematically illustrating an apparatus in accordance with one embodiment, for performing a floating point operation in respect of two input floating point numbers $A_o$ and $B_o$. For a specified floating point operation to be performed, the floating point operation circuitry 30 performs the majority of the required operation. As will be discussed in more detail later, the floating point operation circuitry 30 performs a number of iterations of an argument reduction operation, in one embodiment the argument reduction operation being a multiply accumulate operation performed within a fused multiply accumulate circuit contained within the floating point operation circuitry 30. One of the inputs for the argument reduction operation in each iteration is provided by the output of a reduce and round circuit. As will be explained in more detail below, the purpose of the reduce and round circuitry is to manipulate one of the input operands required by the argument reduction circuitry prior to supplying the manipulated version as an input to the argument reduction circuitry. In particular, the reduce and round circuitry produces a truncated significand with a predetermined rounding applied, where the amount of truncation performed ensures that when that truncated version is then used in the argument reduction operation, no roundoff error occurs in the result of the argument reduction operation. This enables a plurality of values to be generated by the argument reduction circuitry during the plurality of iterations that do not have any roundoff error associated with them, and this in turn enables the operation performed by the floating point operation circuitry 30 to produce a result that is exactly equal to the result that would have been achieved had the true floating point operation been applied directly to the input operands $A_o$ and $B_o$.

As shown in FIG. 1, a number of additional circuits are provided for performing some initial manipulation of the input floating point operand values in order to generate the inputs required by the floating point operation circuitry 30. In particular, a rescale circuit 10 is used to perform a rescaling operation on each of the input operand values. As shown in FIG. 1, the rescale circuitry produces some rescaled floating point operand values $A_S$ and $B_S$ which are scaled with respect to their corresponding original operands $A_o$ and $B_o$ by associated scaling factors A_scale and B_scale.

Depending on the floating point operation to be performed by the circuitry of FIG. 1, it is possible that the scaling factors A_scale and B_scale may not be the same. For example, when performing a floating point divide operation using the circuitry of FIG. 1, it is possible to choose values of A_scale and B_scale that differ from each other, in which event the rescale circuitry 10 also produces a value C_scale that identifies the difference between the two scaling factors A_scale and B_scale.

How the scaling factors A_scale and B_scale are chosen will depend on the floating point operation to be performed by the circuitry of FIG. 1. For example, when performing a floating point divide operation, the scaling factors A_scale and B_scale are chosen so that the exponents of $A_S$ and $B_S$ are at least 4×(M-1), where M-1 is the number of fraction bits for the floating point format being operated on by the circuitry. Hence, considering single precision floating point numbers as an example, M-1 will be 23 bits, since the single precision floating point format has a 23-bit fraction representing a 24-bit significand. Accordingly, in that particular example the scaling factors are chosen so that the exponent field of the rescaled floating point operands $A_S$ and $B_S$ will have a value of at least 92, corresponding to a magnitude of at least $2^{-35}$ (due to the bias of 127 discussed earlier with reference to FIG. 11).

It has been found that by placing this constraint on the size of the exponent of the rescaled values, it can be ensured that no denormal floating point numbers enter into the multiple iterations of the argument reduction operation later performed within the floating point operation circuitry 30. This enables the multiple iterations of the argument reduction operation to produce the correct values to enable an ultimate result to be produced which correctly represents the performance of the floating point operation on the originally specified operands $A_o$ and $B_o$, whereas if any denormals were to enter into one or more of those iterations, then the operation may not operate correctly.

Figure 10:
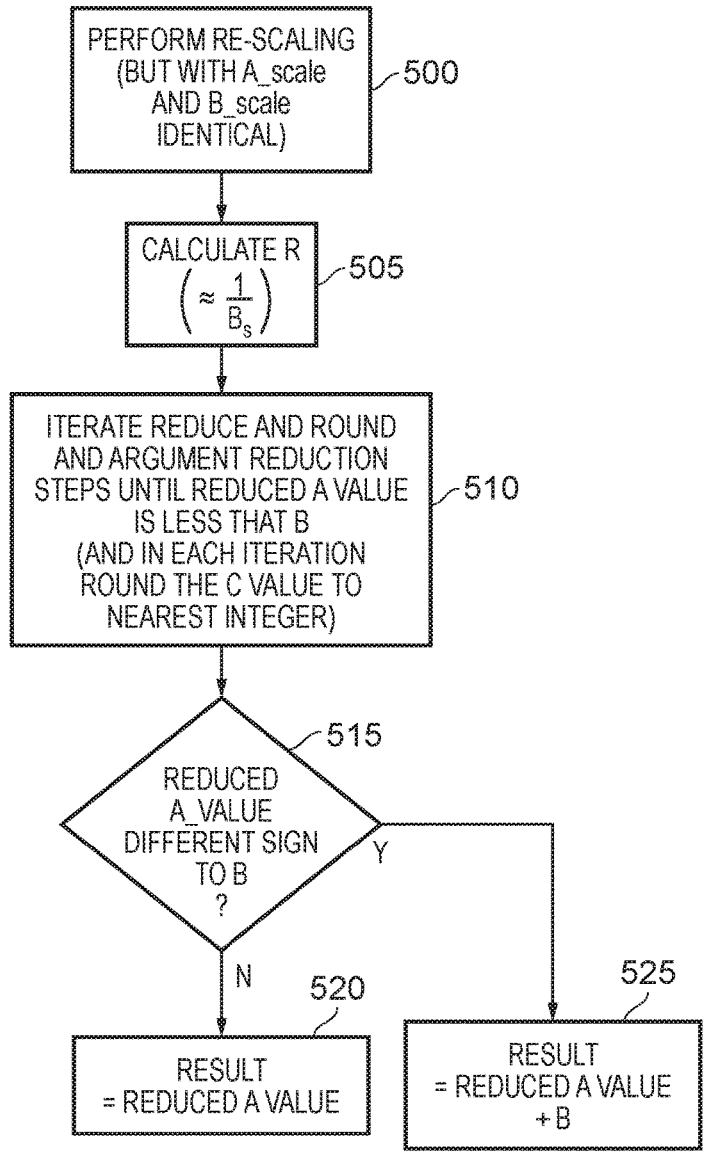

Considering as another example of a floating point operation that may be performed by the apparatus in FIG. 1, a floating point modulus operation could also be performed using the input operands $A_o$ and $B_o$. In that event, when performing the rescaling within the circuitry 10, the rescaling is constrained so that the scaling factors A_scale and B_scale are the same. Further, a value C_scale is set equal to −A_scale. The amount of scaling performed is chosen so that the input operand $B_o$ is scaled in the same way as it was for the earlier-mentioned floating point divide operation, and hence, using the earlier specific example, will result in the exponent field of the rescaled floating point operand $B_S$ having a value of at least 92. The application of the same scaling factor to the other input operand $A_o$ may result in $A_S$ overflowing or underflowing, but this can be accommodated by modifications discussed later herein with reference to FIG. 10.

As shown in FIG. 1, the various outputs from the rescale circuitry 10 are provided to the floating point operation circuitry 30. In addition, an approximate reciprocal circuit 20 is used to generate a value R representing the approximate reciprocal of the rescaled operand $B_S$. In many applications, it will already be the case that a suitable circuit to perform the approximate reciprocal already exists. For example, such a circuit may already be provided within a graphics processing unit (GPU), and the apparatus illustrated in FIG. 1 can be used within a GPU to provide an efficient implementation of certain floating point operations such as the earlier mentioned floating point divide operation, allowing an exact, correctly rounded, result to be achieved with a relatively low hardware cost, and with an acceptable throughput, thereby providing a low cost solution with acceptable performance.

There are several ways in which the approximate reciprocal function may be performed, in one example this involving an initial approximation of some sort followed by one or more Newton iterations. For the purposes of the presently described technique, it does not matter how this calculation is performed, provided that there is knowledge as to the upper bound on the calculations error, which in one embodiment is measured in units of least precisions (ulps).

In one particular example embodiment, an existing reciprocal approximation unit is used that can compute reciprocals to an error of 1 ulp in FP32 format and 128 ulps in FP64 format.

The floating point operation circuitry 30 then performs the required operations using its various inputs in order to generate an exact, correctly rounded, result C equivalent to performing the specified operation on the input operands $A_o$ and $B_o$.

The output value C may then be forwarded for storage in storage element 35, from where it can be accessed for subsequent computations. Alternatively it may be possible in some implementations to provide the result C over a forwarding path directly as an input to additional circuitry arranged to use that value C as an input.

The operation of the floating point operation circuitry 30 will now be discussed in more detail with reference to FIGS. 2A and 2B for the example where the floating point operation being performed is a floating point divide operation, and accordingly the final result C output by the circuitry 30 represents the exact, correctly rounded, result for the division $A_o \div B_o$. As mentioned earlier, in an alternative embodiment a different floating point operation may be performed, such as a floating point modulus operation, where the final result C represents the exact, correctly rounded, result for the computation $A_o$ mod $B_o$.

Figure 2A:
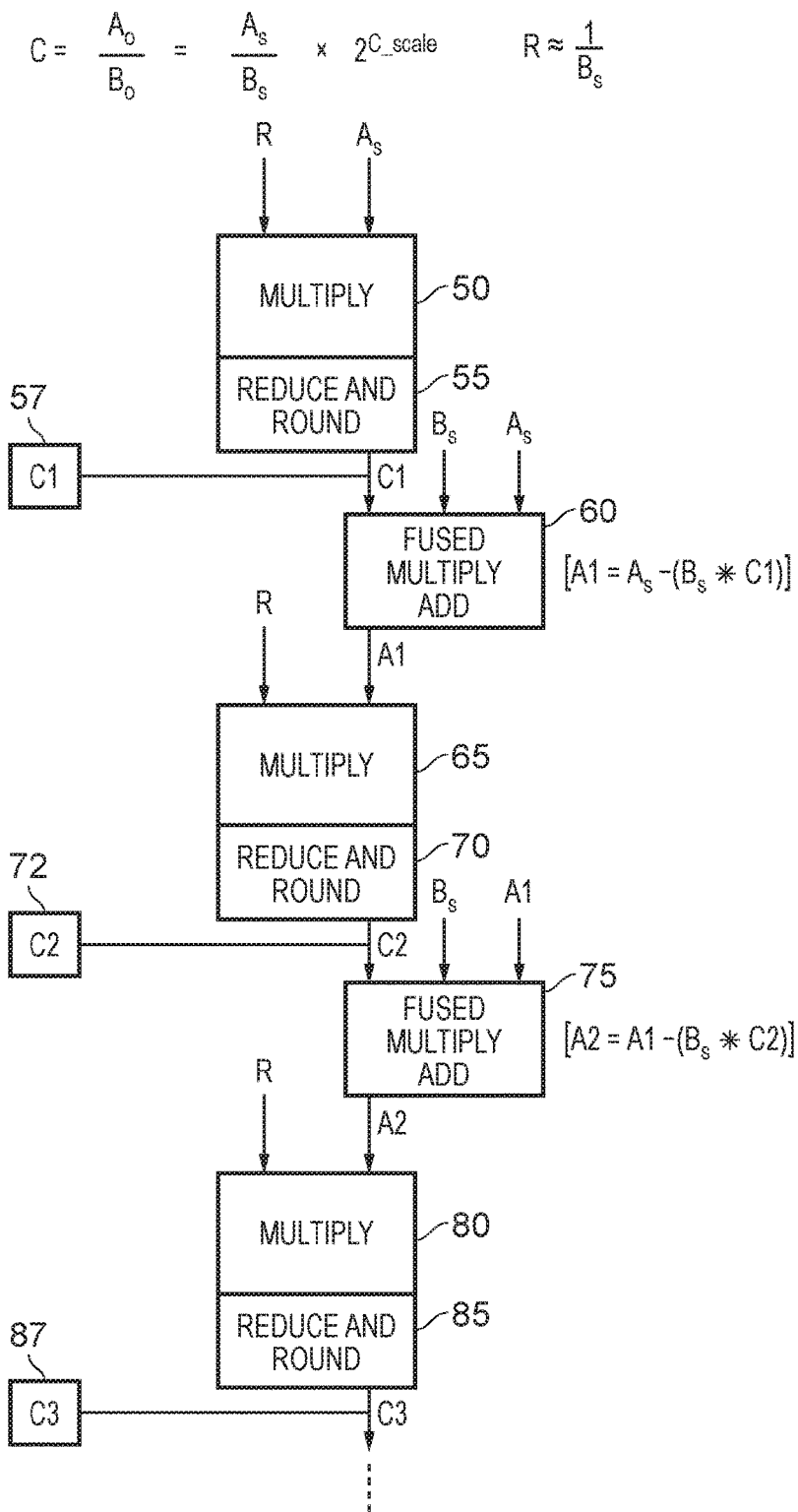

As shown in FIG. 2A, a multiply circuit 50 performs a multiplication of the inputs R and $A_o$ with the multiplication then being subjected to a reduce and round operation by the reduce and round circuitry 55. This means that rather than the multiplication result being provided directly to the fused multiply add circuitry 60, a modified floating point value C1 is instead generated which is represented in a effectively "new" floating point format with a truncated significand. As will be discussed later with reference to FIG. 4, the truncation is performed based on a predetermined value N, which can be predetermined for a particular floating point format. The effect of the reduce and round function is that the modified floating point value C1 represents the exact division result of $A_S$ by $B_S$ with an error bound of less than 1 ulp in respect of the truncated significand. The modified floating point value C1 is stored in the storage element 57 for use later in the computation, and is also provided as an input to the fused multiply accumulate circuitry 60 (also referred to herein as a fused multiply add (FMA) circuit), which performs the multiply accumulate operation shown in FIG. 2A using the modified floating point operand C1, and the two rescaled operand values $A_S$ and $B_S$. This results in the generation of an output floating point value A1. By virtue of the fact that C1 has an error value of less than 1 ulp, this ensures that the output value A1 includes no roundoff error. This ultimately allows the exact result for the division operation to be later computed.

The reason why the reduce and round functionality is used to produce a modified floating point operand can be explained as follows.

The reduce-and-round function is used on approximate division results. Considering the computations C=A/B and C'=A*R, the reduce-and-round function is used to effectively construct a new floating-point format in which C' represents the exact division result C with an error of strictly less than 1 ulp.

If the reciprocal can be computed with an error of X ulps and the reduce-and-round function was not used, then the approximate division result C'=A*R would have an error of at most Y=2X+0.5 ulps.

If there is a result with Y ulps of error in the full-precision format, but the reduce-and-round function is then implemented with N bits of truncation, then the error in the "new" format will be at most $Y'=0.5+Y/2^N$ ulps. From this, if the error bounds on the reciprocal approximation are known, this can be used to determine the smallest value of N that will result in an error bound of less than 1 ulp:

for FP32, the earlier-mentioned example implementation of the approximate reciprocal circuit 20 has X=1. This results in N=3. (N=2 results in an error bound of 1.125 ulps, while N=3 results in an error bound of 0.8125 ulps)

For FP64, the earlier-mentioned example implementation of the approximate reciprocal circuitry 20 has X=128. This results in N=10 (N=9 results in an error bound of 1.0009 ulps, while N=10 results in an error bound of 0.7505 ulps)

Note that these numbers for N are specific to the above example implementation; other implementations of the reciprocal approximation with other error bounds may produce smaller or larger values for N.

Returning to FIG. 2A, it can be seen that the above sequence of multiplication, reduce and round and fused multiply add operations can be repeated in a number of further iterations. For example, as shown, in a second iteration, the multiplication circuitry 65 multiplies R and A1, with the reduce and round circuitry 70 then operating on the multiplication result to produce the modified floating point value C2 which is saved in the storage element 72 for later use, and also input to the fused multiply add circuitry 75 which performs the multiply accumulate operation shown. Again, due to the fact that C2 has an error bound of less than 1 ulp, this ensures that the result A2 has no roundoff error.

In the next iteration, the multiply circuit 80 multiples the values R and A2, with the reduce and round circuitry 85 operating on the multiplication result to produce the modified floating point value C3 which is stored in the storage element 87. This process can be continued as desired to produce the required number of modified floating point values C1, C2, C3 etc. necessary having regard to the desired precision of the division operation. The absence of roundoff error in the fused multiply accumulate stages ensures that the infinite sum C1+C2+C3+ . . . is exactly equal to $A_o \div B_o$. As mentioned earlier, this iteration only actually works with normalised floating point numbers, but the operation of the rescale circuitry 10 ensures that no denormal numbers will enter into the required number of iterations.

The absence of a roundoff error ensures that a pair of number A' and C' can be constructed so that the following identity holds:

C=A÷B=C'+(A'÷B). Accordingly, this means that when the series of modified floating point values C1, C2, C3 are added together, the result is exactly equal to A÷B.

It is possible that the reduce and round function is implemented as a separate function. However, in one embodiment the multiplication and associated reduce and round functionality are implemented in a single fused operation, which improves efficiency.

It has been realised by the inventor that the infinite series C1+C2+C3+ . . . can actually be truncated, whilst still producing the exact result within the available significand space of the floating point format, for the reasons explained below.

Given a floating-point format with M significand bits and N bits of truncation, the sum of the first X terms will produce a division result with at least X*(M−N) significant bits so that the division result has an error of less than 1 ulp.

In one example implementation such as shown in FIG. 2A, the three first terms (C1, C2, C3) are used. For FP32, this gives a division result with 3*(24−3)=63 significant bits: for FP64, this gives a division result with 3*(53−10)=129 significant bits.

If there are M bits in the significand in the target floating-point format, then it can be shown that the division result is one of the following:

A value that is representable as an exact value in the M-bit format.

A value that is representable as a midpoint value in the M-bit format

A value that is at least $2^{(-m-1)}$ ulps removed from the closest representable exact or midpoint value.

As such, if the division result is represented with P bits, where P>2M+2, and there is a guaranteed error bound of strictly less than 1 ulp for the P-bit representation, then the following properties can be proven to hold for the P-bit representation:

If a division result is representable as an exact or midpoint value in the M-bit format, then it will be given an exact representation in the P-bit format.

If a division result is not representable as an exact or midpoint value in the M-bit format, then it will be rounded to a value in the P-bit format so that the rounded P-bit value itself does not hit an M-bit exact or midpoint value.

In the latter case, the division result will lie strictly between V1 and V2, where V1 is an exact value in the M-bit representation and V2 is a midpoint value in the M-bit representation. In this case, the P-bit division result will also lie strictly between V1 and V2.

From this, it follows that if rounding is performed from the P-bit representation to the M-bit representation, then the M-bit representation is a correctly rounded M-bit representation of the division result, which is the ultimate goal. This applies for all rounding modes.

Figure 2B:
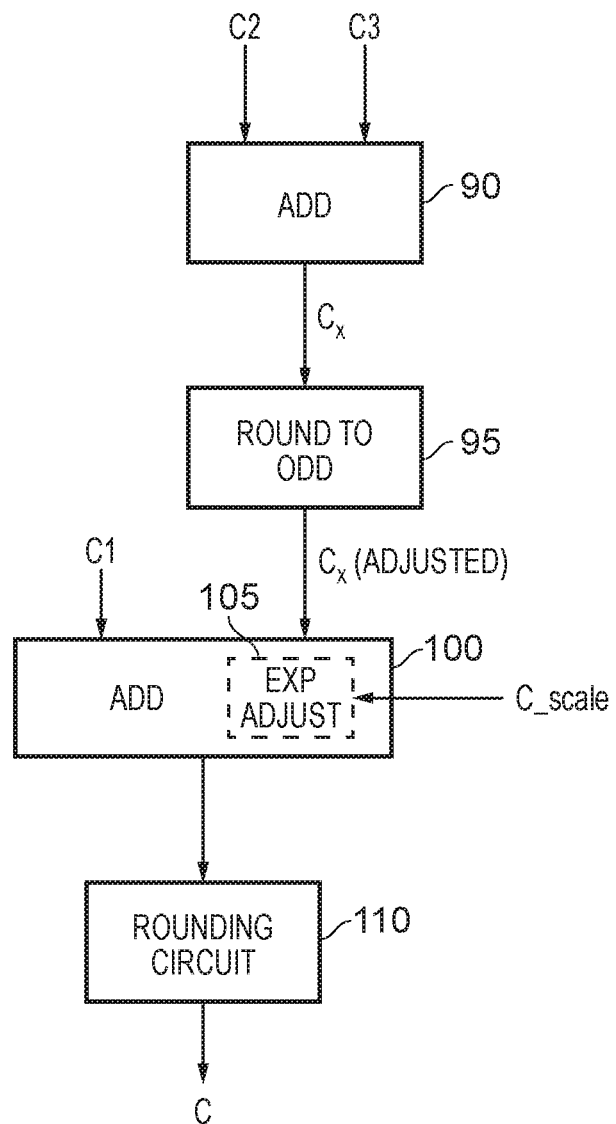

Accordingly, as shown in FIG. 2A, once the third modified floating point value C3 has been produced, no more iterations are required, and the process can proceed to FIG. 2B. As shown in FIG. 2B, the values C2 and C3 are input to add circuitry 90, where they are added together to produce a value $C_x$. It is noted that C1 is of a much larger magnitude than C2 and C3 by virtue of the operations performed in FIG. 2A, and accordingly the first addition adds the two numbers of least magnitude together. The intermediate value $C_x$ is then subjected to a selective round to odd function within the circuitry 95, resulting in the output of $C_x$ (adjusted) to the final addition stage 100. The operation of the round to odd functionality will be discussed later with reference to FIG. 5, but essentially ensures that double rounding is avoided when adding the three numbers together. Accordingly, when the final addition is performed by the add circuitry 100, using C1 and $C_x$, the final addition can then merely be subjected to the desired rounding specified by the rounding mode of the division operation, within the rounding circuit 110, resulting in the final result C being an exact result for the division $A_o \div B_o$, and being correctly rounded having regard to the rounding mode specified by the floating point divide operation.

As also shown in FIG. 2B, an exponent adjust element 105 can be provided within the final addition circuitry 100 to take into account the value C_scale, which as mentioned earlier represents the difference between the scaling factors applied to the original input operands $A_o$ and $B_o$. In particular, it will be noted that the addition C1+C2+C3 is the correct result only in fact if C_scale equals 0. If C_scale is not 0 then the correct result is instead given by $(C1+C2+C3) \times 2^{C\_scale}$. The multiplication by $2^{C\_scale}$ could be performed after the addition steps. However, this is undesirable, since if the correctly rounded result is denormal then the addition and the multiply introduce one rounding each, causing the result to be double-rounded. However, by incorporating the adjustment within the addition, this will avoid the possibility of double rounding occurring, and will allow the rounding in the final step 110 to produce the correctly rounded division result.

There are a number of ways in which the exponent adjust circuitry can be implemented, but in one embodiment this can be simply incorporated by adjusting the temporary result exponent already calculated by the existing circuitry, this calculated value representing a pre-normalized exponent, which may potentially be subjected to a final adjustment within the final rounding stage 110. By adjusting this pre-normalized exponent based on the value C_scale, this ensures that the rounding circuit 110 then produces the correctly rounded result.

Figure 3:
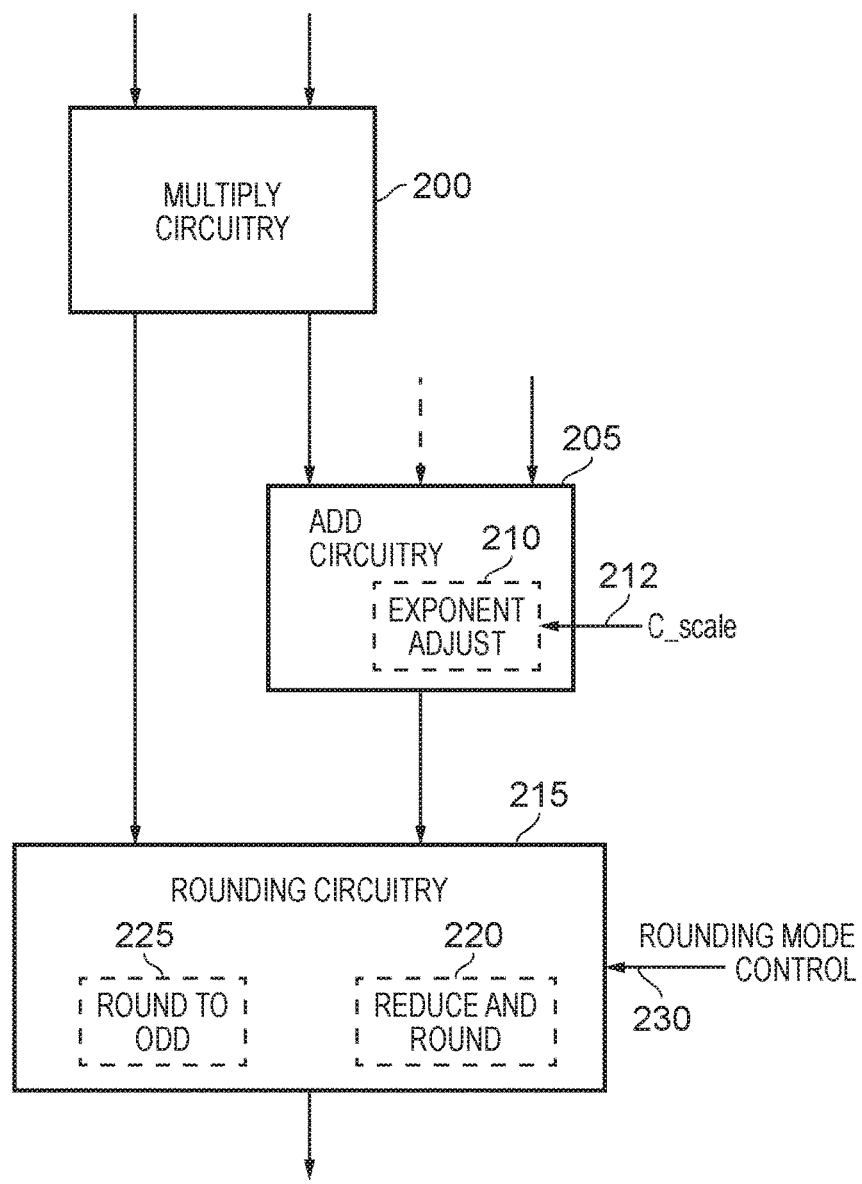

In one embodiment, dedicated circuitry can be constructed to incorporate all of the circuit components shown in FIGS. 2A and 2B. However, in one embodiment it has been found that all of the required functionality can be incorporated within a fused-multiply accumulate circuit, with a couple of augmentations made to particular circuit components. Such an embodiment is shown in FIG. 3. As shown in FIG. 3, the fused multiply accumulate circuit can multiply two inputs within the multiply circuitry 200, and provide the full precision multiply result to adder circuitry 205 for adding to another input. As will be understood, the adder circuitry 205 can also be arranged to perform subtraction as required. The final multiply accumulate result can then be output from the adder circuitry 205 to rounding circuitry 215, where an appropriate rounding operation can be performed. There are various well known rounding modes that will typically be supported by the rounding circuitry 215, examples being round to nearest even (RNE), round to nearest away (RNA), round to zero (RZ), etc. By using a fused multiply accumulate circuit, it is possible to perform a multiply accumulate operation without any rounding being performed on the intermediate multiply result prior to use of that multiplication result in the adder. This enables compliance with the IEEE-754 Standard, which requires most floating point operations to be computed as if the operation was done with unbounded range and precision, and then rounded to fit into a floating point number. If the computation exactly matches a floating point number then the value is always returned, but more normally the computation results in a value that lies between two consecutive floating point numbers. Rounding is the process of picking which of the two consecutive numbers should be returned.

As also shown in FIG. 3, the fused multiply accumulate circuit can also perform multiply operations, where the multiply result is provided directly form the circuitry 200 to the rounding circuitry 215, and can also perform addition operations where the two inputs to the adder circuitry 205 are provided directly, rather than one of the inputs being an output from the multiply circuitry 200. Again, the output from the adder can be provided to the rounding circuitry 215 to allow the addition result to be rounded according to the selected rounding mode.

As will be discussed in more detail below, the reduce and round functionality described earlier can be incorporated within the rounding circuitry 215, as indicated by the dotted box 220 shown in FIG. 3. Also, the round to odd circuitry described with reference to element 95 of FIG. 2B can be incorporated within the rounding circuitry 215, as shown by the dotted box 225. An appropriate rounding mode control signal can be passed over path 230 to the rounding circuitry 215 to select amongst the various rounding modes, including the reduce and round mode and the round to odd mode.

Further, the exponent adjust circuitry 105 shown in FIG. 2B can be incorporated within the adder circuitry 205, as shown by the dotted box 210, with the required C_scale input over path 212 when required.

Figure 4:
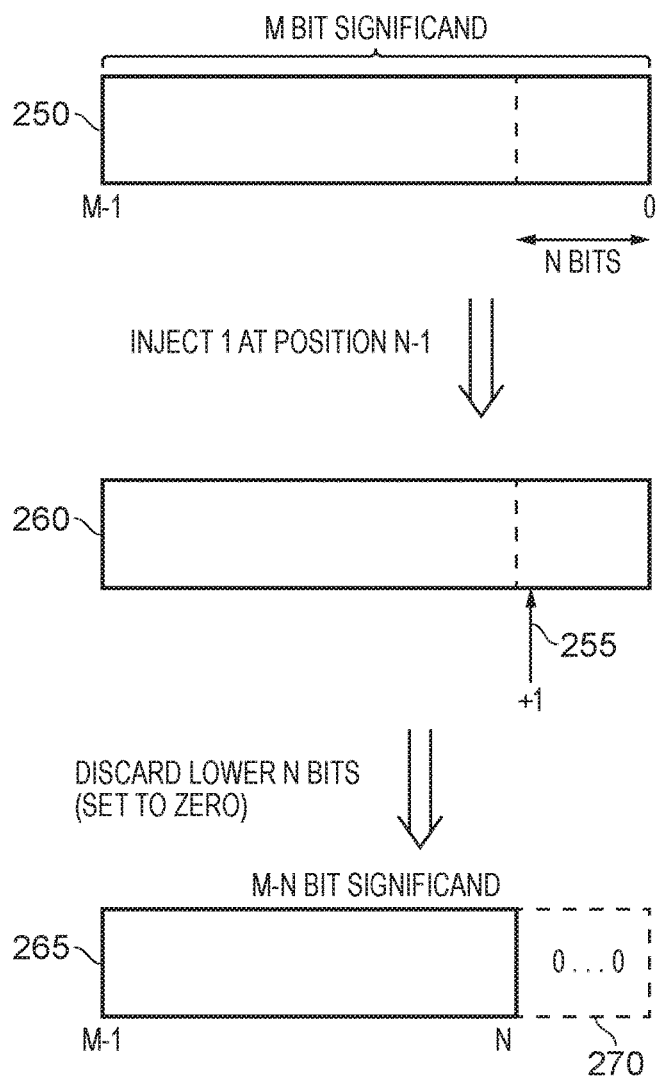

FIG. 4 is a diagram schematically illustrating the reduce and round functionality performed by the block 220 of FIG. 3. The input to the rounding circuitry 215 at this stage comprises the output from the multiply circuitry 200 which has performed one of the multiplications shown by the blocks 50, 65, 80 of FIG. 2A. Assuming the original input floating point operands have an M-bit significand, then the unrounded multiplication result can be considered to have a 2M-bit significand. However, in accordance with the reduce and round functionality, the least significant M-bits can be discarded at this point, and accordingly the input multiplication result as evaluated by the reduce and round circuitry 220 can be considered to comprise an M-bit significand 250 shown in FIG. 4.

As will be recalled from the earlier discussions, the reduce and round functionality effectively produces a truncated significand with a predetermined rounding applied. In one embodiment, the predetermined rounding may be round to nearest away, whilst in an alternative embodiment it may be round to nearest even. The number of bits of truncation is specified by the predetermined value N, and as shown in FIG. 4, the rounding is performed by injecting a logical 1 value at the N-th bit position. Assuming the bits in the M-bit significand are represented as bits 0 to M−1, this results in a logic 1 value being injected at the bit location N−1, as shown by the arrow 255 in FIG. 4, this resulting in the rounded value 260.

Once the rounding has been performed, the lower N bits can then effectively be discarded, in one embodiment this being achieved by setting those least significant N bits to all 0s, as shown by the dotted box 270. This results in the truncated significand 265, forming a significand with M−N bits.

Typically, the exponent is left unchanged during this process. However, if an overflow occurs in the rounded result 260, the exponent will be adjusted by 1 bit, as per standard practice when dealing with overflowed significands during a rounding operation.

FIG. 4 illustrates the "Round-to-Nearest-Away" rounding mode. If instead "round-to-Nearest-Even" rounding mode were used, this would require the additional step where bit N is zeroed out if bits N−1 to 0 are all zeros.

Figure 5:
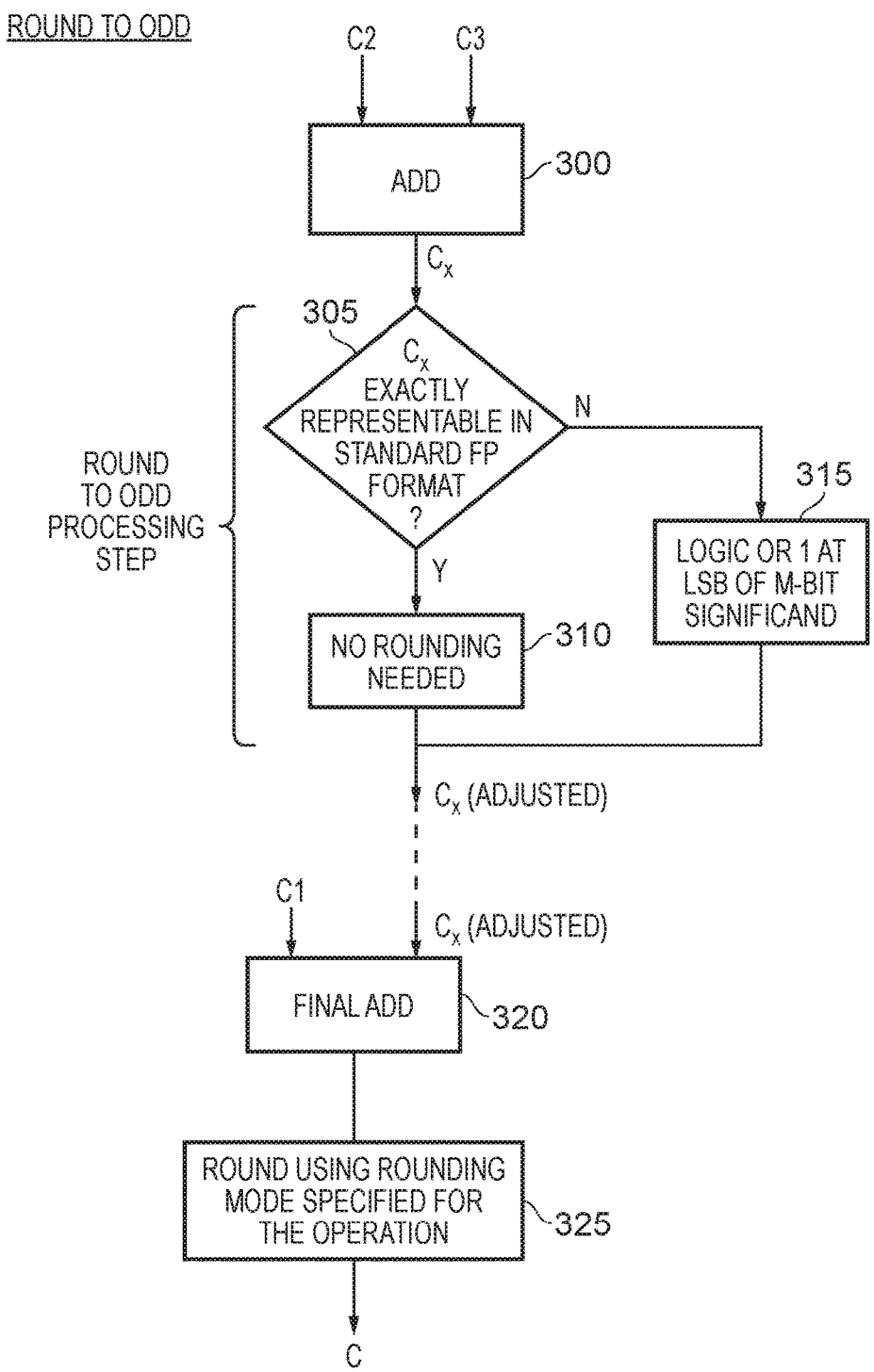

Operation of the round to odd circuit 225 is illustrated schematically in the flow diagram of FIG. 5, which illustrates in more detail the functionality discussed earlier with reference to FIG. 2B, where the three modified floating point values C1, C2 and C3 are added together. At step 300, the smallest two values C2 and C3 are added together, resulting in the intermediate result Cx. At step 305, it is then determined whether the value Cx is exactly representable in the standard floating point format, which may for example be a single precision format or a double precision format. In one embodiment, this check can be implemented by reviewing all of the left over bits and the sticky bit (i.e. the bits to the right of the least significant bit position in the standard floating point format) to check whether those bits are all 0s. If they are, then the value Cx can be exactly representable in the standard floating point format, and accordingly the process proceeds to step 310 where no rounding is needed. However, if it is determined that the value Cx is not exactly representable in the standard floating point format, then the process proceeds to step 315, where a value 1 is logically ORed at the least significant bit position of the M-bit significand. This ensures that after step 315 has been performed, the significand represented within M-bits will be an odd number, due to the least significant bit being set to a logic 1 value. This is irrespective of whether the number prior to the performance of the logic OR operation was even or odd.

Figure 7A:
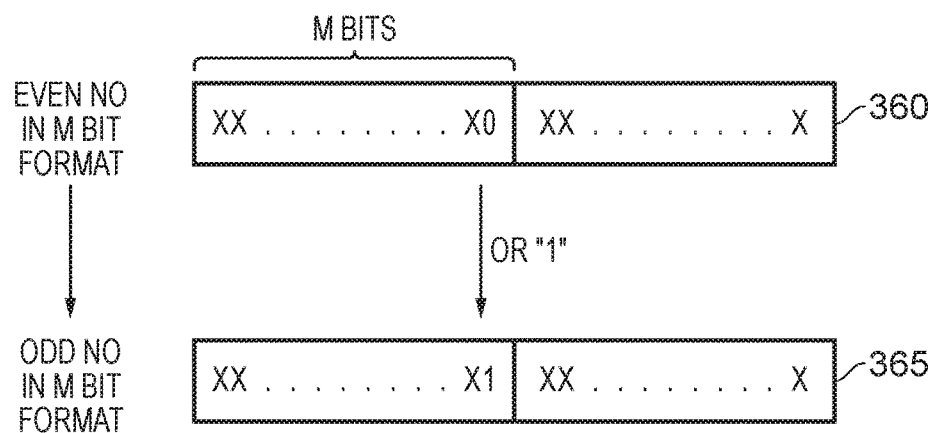
Figure 7B:
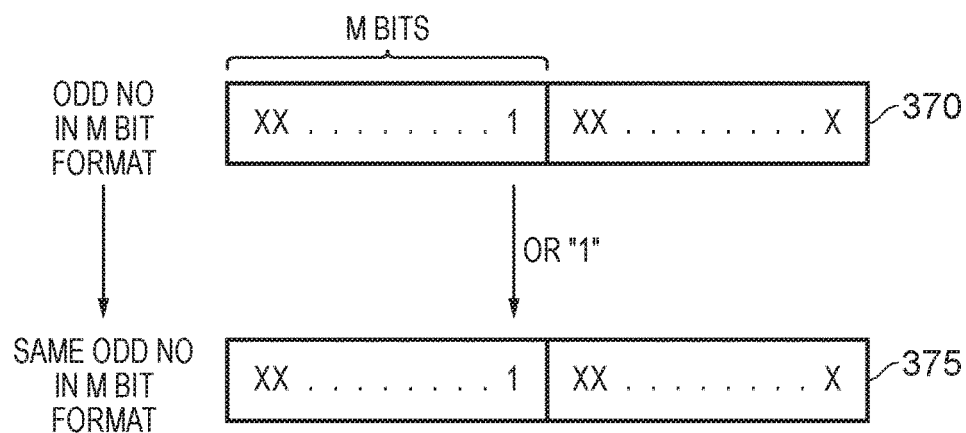

This is shown schematically in FIGS. 7A and 7B, where an "x" denotes a don't care state for the bit value. As shown in FIG. 7A, if the value Cx takes the form 360, and accordingly is an even number when considering only the most significant M-bits, the logic OR operation will result in the number 365 which is an odd number when considered in the M-bit format. As shown in FIG. 7B, if instead the addition result Cx takes the form 370, and is an odd number when considered in the M-bit format of the most significant M-bits, then the logic OR operation will result in no adjustment, and the resulting value 375 will also be an odd number.

Following steps 310 or 315, then the adjusted value Cx is output to the final addition stage 320, along with the other modified floating point value C1. At this point, within Cx all significand bits other than the most significant M-bits of the value Cx as adjusted can be discarded. The final addition step 320 then adds C1 and Cx and outputs the results to the rounding stage 325, which then rounds according to the rounding mode specified for the operation, using the standard rounding circuitry 215 of the FMA circuitry when adopting the embodiment of FIG. 3.

If the number of C values to be added together is increased, then the selective round-to-odd functionality of steps 305 to 315 will be performed in every addition step except the final one.

Figure 6A:
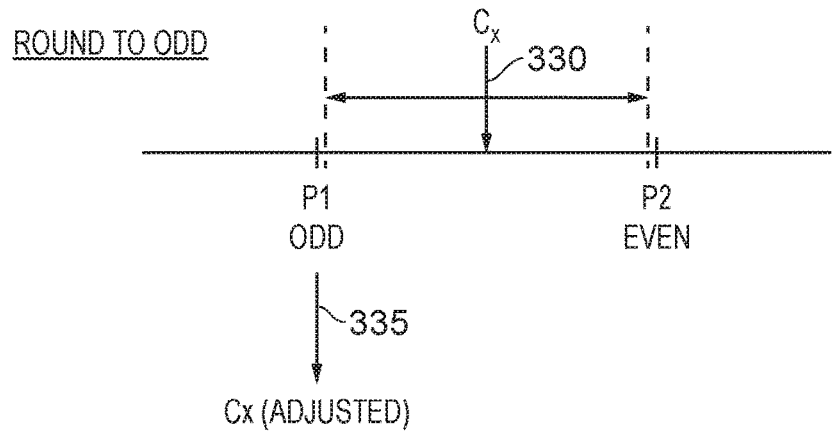
Figure 6B:
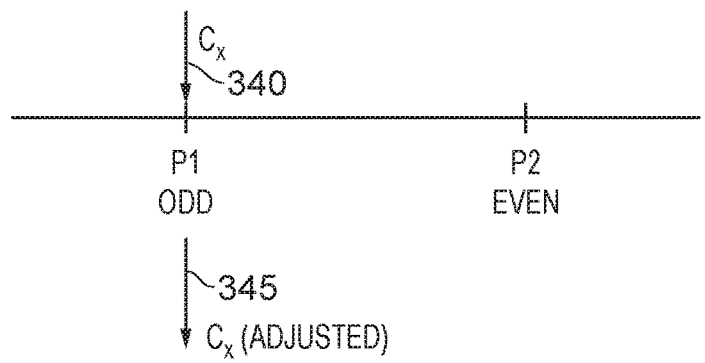
Figure 6C:
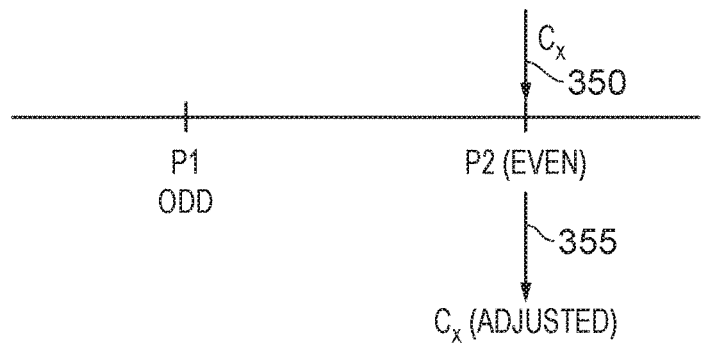

FIGS. 6A-6C illustrate the effect of steps 305, 310 and 315. If the two closest representable values in the standard floating point format are P1 and P2 as shown in FIG. 6A, then if the value Cx 330 is anywhere between P1 and P2, but not actually equal to either P1 or P2, the value Cx (adjusted) as shown by the arrow 335 is set equal to P1, in this example it being assumed that P1 is an odd value and P2 is an even value. If instead P2 were the odd value, then any of the values of Cx shown in FIG. 6A would be adjusted to P2. The functionality shown in FIG. 6A is a result of performing step 315 of FIG. 5.

As shown in FIG. 6B, if the Cx value 340 is exactly representable in the standard floating point format, due to it matching P1, then no adjustment is made, as shown by the arrow 345. Similarly, if the value Cx 350 matches P2, then no adjustment is made, as shown by the arrow 355 in FIG. 6C.

By performing the selective round to odd functionality described with referenced to FIGS. 5 to 7B, this avoids the prospect of a double rounding operation being performed when adding the three numbers C1, C2 and C3. The reason why this is the case is described below.

As will be recalled from the earlier discussion of truncating the infinite series of argument reduction operations, if rounding is performed from the P-bit representation to the M-bit representation, then the M-bit representation is a correctly rounded M-bit representation of the division result. However, it will be appreciated that in the above described process there is not actually a direct representation of P, but instead P is represented as C1, C2 and C3, so that P=C1+C2+C3.

It is additionally known that C1 is of much larger magnitude than C2+C3.

This is where the round to odd mode enters the picture. The round to odd mode works as follows: it first performs the addition by rounding towards zero, then if the addition result was not exact, it logic-ORs a 1 into the least significant bit.

By performing the addition Cx=C2+C3 with the round to odd mode, then the final, correctly rounded division result can be obtained, by performing the addition C=C1+Cx with the desired rounding mode.

The reason why this works is as follows. There are two cases to consider:

The case where the intermediate addition result Cx=C2+C3 computes an exact result without rounding. In this case, the only source of roundoff error is the final addition C=C1+Cx, and it immediately follows that the final result is correctly rounded.

The case where the intermediate addition result Cx=C2+C3 introduces roundoff error.

The latter case is the problematic one. Now, note that since C1 is of much larger magnitude than Cx, it follows that all possible cases where the sum C1+C2+C3 hit exact or midpoint cases are cases where Cx is computed without roundoff error and has a bottom bit of 0.

Now, the round to odd rounding works as follows:

If the C2+C3 result is not exactly representable, then the lowest bit is set to 1.

As a result, if the C2+C3 addition result is very slightly larger than an exactly-representable value with 0 in its lowest bit, then it is rounded up.

Alternatively, if the C2+C3 addition result is very slightly smaller than an exactly-representable value with 0 in its lowest bit, then it is rounded down.

From this, it follows that:

If the exact result of C1+C2+C3 is an exact or midpoint value in the M-bit format, then the addition C1+Cx will hit the same exact or midpoint case.

If the exact result of C1+C2+C3 is NOT an exact or midpoint value in the M-bit format, then the use of the round to odd mode for Cx=C2+C3 will safely round Cx away from values that could potentially cause the addition C1+Cx to hit exact or midpoint values. As such, C1+Cx will in this case correctly avoid all exact or midpoint cases.

This helps to ensure correct rounding.

Figure 8:
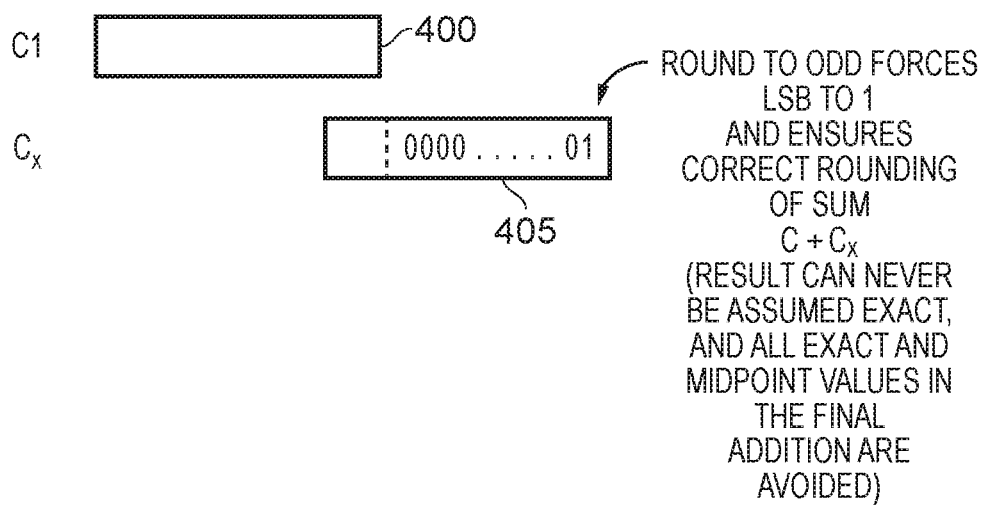

This is shown schematically in FIG. 8. The M-bit significand of C1 400 is added to the M-bit significand of Cx 405, which will typically overlap as shown in FIG. 8, due to the different exponent values. Given that the least significant bit of the significand 405 has been set to a logic 1 value, it will be appreciated that this ensures that the result of C1+Cx can never be assumed to be exact when viewed in the M-bit space of the final result, nor can it represent a midpoint value. This hence ensures correct rounding in the final stage 325 of FIG. 5, in accordance with the specified rounding mode for the operation.

As mentioned earlier with reference to FIG. 3, both the reduce and round functionality 220 and round to odd functionality 225 can readily be incorporated within the rounding circuitry 215 of an existing FMA unit, by an appropriate control signal over the path 230 to incorporate the additional rounding modes. One way in which these two additional rounding modes can be readily incorporated is as follows.

In an FMA unit, the round-to-nearest-even rounding mode is normally implemented as follows:

The significand is computed with a few leftover bits, and a sticky-bit is collected by ORing together low-order bits that were discarded.

A constant is added to the number. This constant contains a '1' in the bit-position below the least-significant-bit; as such, the constant is actually 0.5 ulps.

If the result of the addition resulted in '1' in the least significant bit but all the leftover bits and the sticky-bit are 0 after the addition, then the least significant bit is zeroed out.

The above approach is standard. In the described embodiment, the rounding circuitry is augmented as follows:

For the reduce_and_round( ) mode with N bits of truncation, a constant is again added; however, while the constant is 0.5 ulps for round-to-nearest-even, it is set to $2^{N-1}$ ulps for reduce_and_round( ), in order to add a "1" to the bit position shown in FIG. 4.

For the reduce_and_round( ) mode, the N lowest bits after the rounding addition has been performed are zeroed out, as shown in FIG. 4.

For the round to odd mode, all the leftover bits and the sticky-bit are checked, like for round-to-nearest-even;

however, if they are all 0 then nothing further is done, else a logic-OR of a '1' into the result of the rounding takes place.

As explained earlier, in situations where the value C_scale is non-zero, then the result of adding C1, C2 and C3 needs to be adjusted. In one embodiment a fused-add-scale operation is provided of the following form:

fas (C1, Cx, C_scale)

$$\Rightarrow (C1+Cx)*2^{C\_scale}$$

This operation performs the above computation as a single fused operation with a configurable rounding mode, which then enables the correctly rounded division result to be obtained. In the case where the true division result is non-denormal, then the operation fas( ) trivially rounds correctly. However, in cases where the true division result is denormal, the exact and midpoint cases are a proper subset of the exact and midpoint cases in C1+Cx with no added cases, and as such using the fas( ) operation covers all subcases.

As part of the standard FMA unit, a pre-normalization exponent is typically computed based on the input arguments and this exponent is then modified when performing result normalisation in the final rounding stage. As discussed earlier, when performing the above fused-add-scale operation, the FMA unit is augmented by adding C_scale to the pre-normalization exponent within the add circuitry 205, as shown by the block 210 in FIG. 3.

From the above description, it can be seen that the required functionality can be readily incorporated within an existing FMA unit, with very little cost and complexity. All that is required in addition is the circuitry 10 to rescale the input operands, and an approximate reciprocal circuit 20, which in many example implementations will already exist. For example, when the above described techniques are employed within a graphics processing unit, it is typically the case that such an approximate reciprocal circuitry 20 will already be present for other purposes, and hence can merely be reused in order to generate the value R used by the above described computations.

As a further possible optimisation that can be used in some embodiments, it is possible to omit the calculation of C3 in most, but not all, cases, and just compute the division above with Cx=C2. This will give correct results most of the time but not always, as explained below.

Now, if there are M significand bits, with the reduce_and_round( ) function truncating N of them, the top N bits of C2 should be of the same magnitude as the bottom N bits of C1, and the top N bits of C3 should be of the same magnitude as the bottom N bits of C2. As such, in order for C3 to affect the final result, a carry or borrow must propagate through a long sequence of bits in the middle of C2. Such propagation can only happen if the bits in the middle of C2 are a long streak of all 1s (if C2 and C3 are of the same sign) or all 0s (if C2 and C3 are of different signs).

Figure 9:
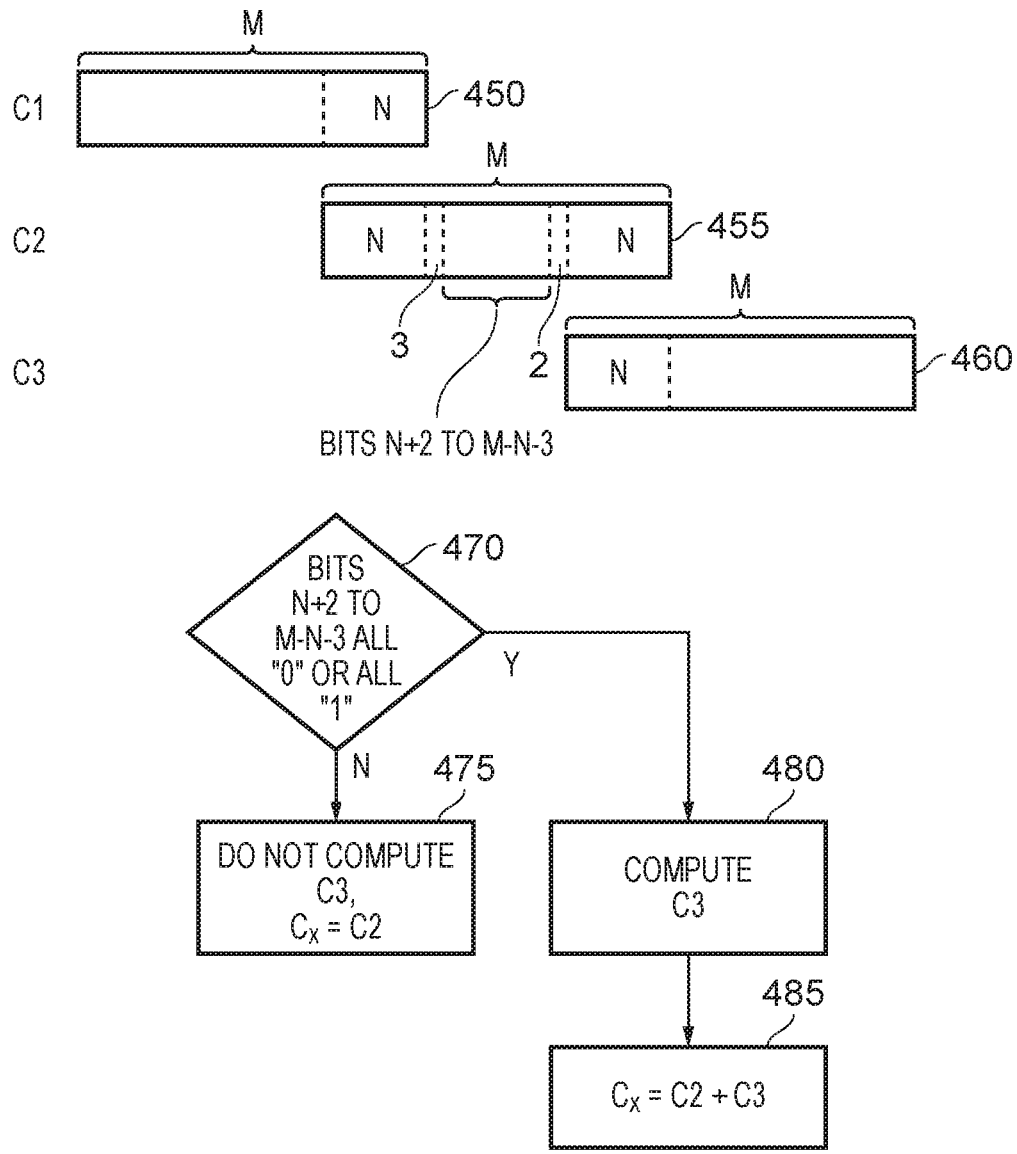

As such, as shown in FIG. 9, in one embodiment bits in C2's significand from bit N+2 up to bit M−N−3 can be tested (see step 470). If these bits are an all-0s sequence or an all-1s sequence, then C3 needs to be computed at step 480 since it can affect the final result. The addition C2+C3 can then be performed at step 485. If however these bits are not all-0s or all-1s, then we can safely abstain from computing C3.

For the above example implementation, this gives 13 bits to check in the FP32 case and 27 bits to check in the FP64 case. If these bits are checked, it has been found that we can thus abstain from computing C3 about 99.97% of the time for FP32 and 99.9999985% of the time for FP64.

The above described augmentations to the FMA unit can in one embodiment also enable the FMA unit to be used for other operations other than a correctly rounded divide operation as described above. As discussed earlier, the iterations of the argument reduction operation produce successively values A1, A2, A3 and so on. These iterations (incorporating the reduce and round functionality described earlier) can, with some modifications, be used to implement for example a floating point modulus operation efficiently. This is described schematically with reference to the flow diagram of FIG. 10. In particular, at step 500, the rescale circuitry 10 is performed to rescale the input operands $A_o$ and $B_o$. However, when performing the floating point modulus operation, A_scale and B_scale are constrained to be identical. In addition, a value C_scale is set equal to −A_scale (which as discussed later can be used to handle an overflow condition in $A_S$). As described earlier, when performing the scaling operation the scaling factor B_scale is chosen so that the exponent of $B_S$ is at least 4×(M−1), where M−1 is the number of fraction bits for the floating point format being operated on by the circuitry.

At step 505, the approximate reciprocal R is computed using the circuitry 20. Thereafter, at step 510, the reduce and round argument reduction steps are iterated until a reduced A value is obtained that is less that then operand $B_S$. In each iteration the modified floating point value C produced is rounded to the nearest integer before computing the corresponding A value. This will always cause an integer multiple of $B_S$ to be subtracted from the A value without introducing a roundoff error.

Following step 510, then at step 515 it is determined whether the reduced A value is of a different sign to the B value. If it is not, then the result of the modulus operation is the reduced A value determined in the final iteration performed at step 510, as shown by step 520. However, if the signs are different, then the result is as shown in step 525, where the reduced A value is added to the value $B_S$.

The above process assumes that application of the scaling factor A_scale (which is the same as B_scale) to the other input operand $A_o$ will not result in a rescaled operand $A_S$ that has overflowed or underflowed. However, such underflow and overflow conditions can be detected, and the operation modified accordingly, for example by using the following process.

The underflow condition can arise in the case of a downscaling, if $A_o$ is much smaller than $B_o$. In this case, one appropriate course of action is to do a test for whether |A| is smaller than |B/2| before doing the full modulus calculation at step 510. If |A| is smaller than |B/2|, then $A_o$ can just be returned directly as the result C, without any further computation being necessary.

The overflow condition can arise in the case of an upscaling, if $A_o$ is much larger than $B_o$. In this case, one appropriate course of action is to test for such a condition, and in the presence of that condition to then modify the modulus calculation performed at step 510 as follows:
1) First, scale $B_o$ but not $A_o$ upwards, in order to produce $B_S$;
2) Perform the modulus calculation, using the above-described argument reduction method to produce an intermediate result: $A'=A_o \bmod B_S$;
3) Next, scale A' upwards by the same scaling factor as used for $B_o$, in order to produce $A_S$;
4) Perform the modulus calculation again, using the above-described argument reduction method, to produce a second intermediate result: Cs=As mod Bs; and 5) Finally, scale the second intermediate result downwards using the C_scale factor (which is −A_scale), such that the final result $C=Cs*2^{C\_scale}$.

The process can then continue with steps 515, 520 and 525 as required.

In one embodiment, some of the additional components provided within the FMA circuit as shown in FIG. 3 can be additionally used for other purposes. For example, the fused-add-scale circuitry can be used to introduce free multiplications by powers of 2, which may for example be common in shader programs that usually run in GPUs. Implementing the function as an augmentation to an FMA unit as described also makes it possible to implement the ldexp( ) function at no additional cost, and to construct a fused-multiply-and-scale primitive as well.

The round to odd mode may also be useful for multi-stage narrowing data conversions such as FP64 to FP32 to FP16 and INT64 to FP64 to FP32. For such conversions, if the round to nearest rounding mode were to be used in both stages this causes double rounding and ultimately results in an incorrectly rounded result. However, by using the round to odd mode for all stages other than the final stage, this causes the sequence as a whole to implement correct rounding.

From the above described embodiments, it will be seen that such embodiments provide a very efficient mechanism for performing certain floating point operations in a way that ensures that the correct result is obtained, with the correct rounding applied. This hence provides a very efficient mechanism for incorporating those floating point operations, examples of which are floating point division and floating point modulus operations.

There are many scenarios where such an approach would be useful. For example floating point divide or floating point modulus operations may be used in many computations performed by CPUs, GPUs, DSPs, etc., and the above described techniques will enable significant simplification to the circuitry required in those devices when supporting execution of such floating point operations. By way of specific example, given a throughput orientated architecture such as a GPU architecture that already features an FMA unit and an approximate reciprocal unit, it enables operations such as floating point divisions and floating point modulus operations to be performed with correct rounding at a reasonable throughput and at a very low hardware cost.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:
1. An apparatus comprising:
argument reduction circuitry to perform an argument reduction operation;
reduce and round circuitry to generate from a supplied floating point value a modified floating point value to be input to the argument reduction circuitry; and
rescaling circuitry to receive at least one floating point operand value and, for each floating point operand value, to perform a rescaling operation to generate a corresponding rescaled floating point value such that the rescaled floating point value and the floating point operand value differ by a scaling factor;
the reduce and round circuitry being arranged to modify a significand of the supplied floating point value, based on a specified value N, in order to produce a truncated significand with a specified rounding applied, the truncated significand being N bits shorter than the significand of the supplied floating point value, and being used as a significand for the modified floating point value;
the specified value N being such that the argument reduction operation performed using the modified floating point value inhibits roundoff error in a result of the argument reduction operation; wherein:
the argument reduction circuitry and the reduce and round circuitry are employed in a plurality of iterations, in each iteration other than a first iteration, the supplied floating point value received by the reduce and round circuitry being derived from a result value generated by the argument reduction circuitry in a preceding iteration;
the argument reduction circuitry is arranged to receive, in addition to the modified floating point value, at least one additional floating point value, said at least one additional floating point value being determined based on said at least one rescaled floating point value;
the scaling factor being such that an exponent of each rescaled floating point value will ensure that no denormal values will be encountered when performing the plurality of iterations of the argument reduction operation; and
the rescaling circuitry is arranged to generate first and second rescaled floating point values, wherein the apparatus is arranged to generate a result equal to an alternative result generated by performing a specified floating point operation on first and second floating point operand values from which said first and second rescaled floating point values are generated by the rescaling circuitry, the specified floating point operation being a floating point divide operation to divide the first floating point operand value by the second floating point operand value, and the result for the floating point divide operation being determined by an adder arranged to add together a plurality of modified floating point values produced by the reduce and round circuitry during said plurality of iterations;
the adder is arranged to add together the plurality of modified floating point values as a series of addition operations; and
when the scaling factor associated with the first rescaled floating point value is different from the scaling factor associated with the second rescaled floating point value, the adder is arranged to perform an augmented, final addition operation in dependence on the difference between the scaling factors when performing the final addition.

2. An apparatus as claimed in claim 1, wherein the specified value N is such that the modified floating point value has an error bound of less than 1 unit of least precision (ulp) of the N bits shorter truncated significand.

3. An apparatus as claimed in claim 2, wherein the specified value N is the smallest integer value that ensures that the modified floating point value has said error bound of less than 1 ulp.

4. An apparatus as claimed in claim 1, wherein:
the significand of the supplied floating point value comprises M bits; and
the reduce and round circuitry is arranged to inject a rounding value at an N-th bit position of the significand of the supplied floating point value to produce a rounded value, and then to form as the truncated significand the most significant M-N bits of the rounded value.

5. An apparatus as claimed in claim 4, wherein the truncated significand is represented as an M-bit value by setting the least significant N bits of the M-bit value to logic 0 values.

6. An apparatus as claimed in claim 1, wherein the specified value N is dependent on a floating point format of the supplied floating point value.

7. An apparatus as claimed in claim 1, wherein the argument reduction operation is a multiply-accumulate operation.

8. An apparatus as claimed in claim 7, wherein the argument reduction circuitry comprises fused multiply-accumulate circuitry.

9. An apparatus as claimed in claim 1, wherein in said each iteration other than the first iteration the supplied floating point value received by the reduce and round circuitry is an output of a multiplication operation performed using as one input the result value generated by the argument reduction circuitry in said preceding iteration.

10. An apparatus as claimed in claim 1, wherein the number of iterations in said plurality is chosen so as to ensure that the result for the floating point divide operation will equate with division of the first floating point operand value by the second floating point operand value rounded in accordance with a specified rounding mode for the floating point divide operation.

11. An apparatus as claimed in claim 10, further comprising analysis circuitry to analyse specified bits of the modified floating point value produced in a penultimate iteration, and to cause the final iteration to be omitted when the analysis indicates that the specified bits are other than at least one predetermined bit pattern.

12. An apparatus as claimed in claim 11, wherein said at least one predetermined bit pattern comprises a bit pattern of all 1s or a bit pattern of all 0s.

13. An apparatus as claimed in claim 1, wherein said addition is performed as a series of addition operations, and for each addition operation other than a final addition operation a round to odd rounding function is applied to the result of that addition if the result of that addition is not exactly representable in a specified floating point format.

14. An apparatus as claimed in claim 1, wherein the final addition operation is augmented so as to adjust the exponent of the addition result by an amount determined from the difference between the scaling factors, prior to a final rounding of the addition result being performed.

15. An apparatus as claimed in claim 1, wherein the specified floating point operation is a floating point modulus operation to evaluate a remainder resulting from dividing the first floating point operand value by the second floating point operand value.

16. An apparatus as claimed in claim 15, wherein the result value for the floating point modulus operation is determined from a result value generated by the argument reduction circuitry in the iteration where that result value is less than the second rescaled floating point value.

17. An apparatus as claimed in claim 16, wherein the same scaling factor is associated with the first and second rescaled floating point values.

18. An apparatus as claimed in claim 1, further comprising a reciprocal estimation circuit to generate an estimated reciprocal of the second rescaled floating point value with a relative error having an error bound of Y, and the specified value N is dependent on the value Y.

19. An apparatus as claimed in claim 1, wherein the specified rounding applied by the reduce and round circuitry when producing the truncated significand is one of round to nearest away and round to nearest even.

20. A method of controlling rounding when performing a floating point operation within a data processing apparatus, comprising:
employing argument reduction circuitry to perform an argument reduction operation;
reduce and round circuitry performing a reduce and round operation to generate from a supplied floating point value a modified floating point value to be input to the argument reduction circuitry;
rescaling circuitry receiving at least one floating point operand value and, for each floating point operand value, the rescaling circuitry performing a rescaling operation to generate a corresponding rescaled floating point value such that the rescaled floating point value and the floating point operand value differ by a scaling factor;
the reduce and round circuitry modifying a significand of the supplied floating point value, based on a specified value N, in order to produce a truncated significand with a specified rounding applied, the truncated significand being N bits shorter than the significand of the supplied floating point value, and being used as a significand for the modified floating point value;
the specified value N being such that the argument reduction circuitry performing the argument reduction operation using the modified floating point value inhibits roundoff error in a result of the argument reduction operation; wherein:
the argument reduction circuitry and the reduce and round circuitry are employed in a plurality of iterations, in each iteration other than a first iteration, the supplied floating point value received in the receiving step being derived from a result value generated by the argument reduction circuitry in a preceding iteration;
the argument reduction circuitry receiving, in addition to the modified floating point value, at least one additional floating point value, said at least one additional floating point value being determined based on said at least one rescaled floating point value;
the scaling factor being such that an exponent of each rescaled floating point value will ensure that no denormal values will be encountered when performing the plurality of iterations of the argument reduction operation; and
the rescaling circuitry generating first and second rescaled floating point values, wherein the method involves generating a result equal to an alternative result generated by performing a specified floating point operation on first and second floating point operand values from which said first and second rescaled floating point values are generated, the specified floating point operation being a floating point divide operation to divide the first floating point operand value by the second floating point operand value, and the result for the floating point divide operation being determined by an adder circuit adding together a plurality of modified floating point values produced by the reduce and round circuitry during said plurality of iterations;

said adding being performed by the adder circuit as a series of addition operations, and when the scaling factor associated with the first rescaled floating point value is different from the scaling factor associated with the second rescaled floating point value, a final addition operation by the adder circuit is augmented in dependence on the difference between the scaling factors when performing the final addition.

\* \* \* \* \*